Feb. 27, 1968  G. V. SMITH  3,371,182
ELECTRO-EROSION APPARATUS
Filed Sept. 30, 1963  3 Sheets-Sheet 2

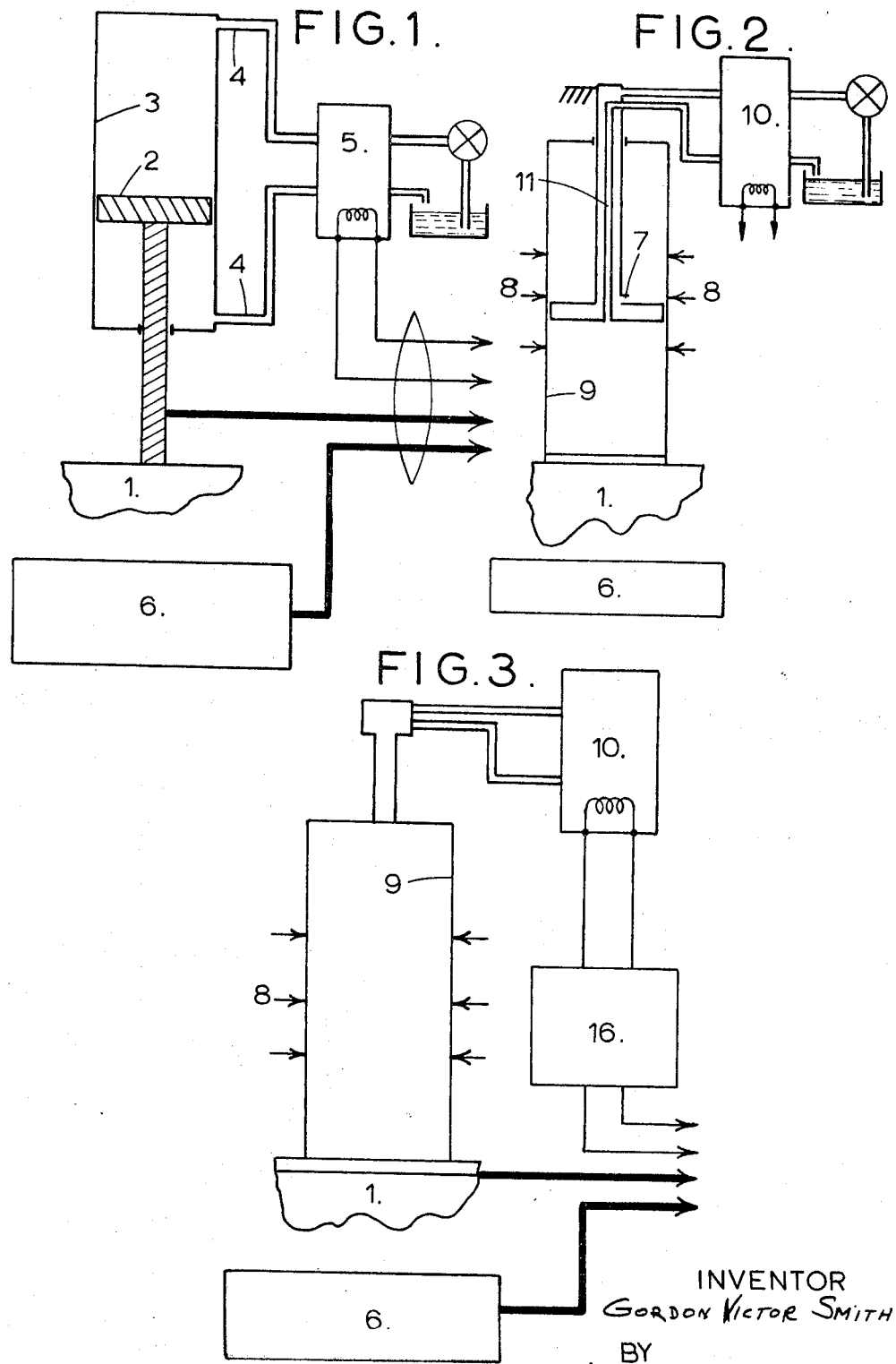

INVENTOR
GORDON VICTOR SMITH
BY
Shoemaker and Mattare
ATTORNEYS

United States Patent Office 3,371,182
Patented Feb. 27, 1968

3,371,182
ELECTRO-EROSION APPARATUS
Gordon V. Smith, Highnam, England, assignor to Sparcatron Limited, Stafford, England, a British company
Filed Sept. 30, 1963, Ser. No. 312,748
Claims priority, application Great Britain, Oct. 2, 1962, 37,333/62
4 Claims. (Cl. 219—69)

ABSTRACT OF THE DISCLOSURE

Electro-erosion apparatus in which a hydraulic electrode spacing system employs a fixed piston having an upwardly extending rod with fluid ducts in it, and a movable cylinder supported on and guided by the piston's large outside bearing area for improved mechanical precision and guidance, the cylinder supporting the movable electrode, and the position of the cylinder and attached electrode with respect to the fixed electrode (workpiece) being maintained by a fluid controlling valve operated by a solenoid connected across the spark gap so that its current is proportional to the gap voltage. The system further includes a modulator means for causing the cylinder to cyclically vibrate axially through a small amplitude to help keep the spark gap clear, and the system also having means for providing reduced power across the gap and solenoid winding of the valve during setting-up of the apparatus, the power being inadequate to erode the workpiece but strong enough to cause the movable electrode to continually approach it.

---

This invention relates to electro-erosion apparatus and has more especial reference to the control of electrode movement and setting-up in spark machining apparatus.

It is known that the use of an hydraulically-actuated electrode control system in spark machining apparatus can improve the metal removal rate and surface finish obtainable with a given spark-generating circuit.

According to one aspect of the present invention, instead of the electrode being carried by the movable piston of the hydraulic system, such piston is rigidly mounted while its cylinder is slidable and carries the electrode.

The invention will be further described with reference to the accompanying drawings where several arrangements are illustrated, and in which:

FIGURE 1 is a diagrammatic representative of a known arrangement, and

FIGURE 2 is a similar representation of an arrangement according to the invention.

FIGURE 3 is also a diagrammatic representation of an arrangement according to the invention including provision for vertically oscillating the electrode.

Figure 4:
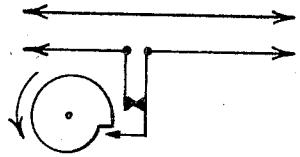
FIGURES 4, 5 and 6 show examples of gate circuit for use in such an arrangement.

Referring now to the drawings and first to the method of control shown in FIGURE 1, an electrode 1 is fixed to a movable piston 2 which is enclosed by a hydraulic cylinder 3. Movement of the piston is controlled by displacement of fluid from the hydraulic pump via an electro-hydraulic valve 5 and connections 4 to the cylinder chambers above and below the piston. The hydraulic fluid is diverted either to the upper or lower chambers by movement of a "spool" in the electro-hydraulic valve. The "spool" is held in a central position by a spring arrangement and deflected away from centre by a magnetic force produced by a solenoid. The current required to operate the solenoid arrangement is derived from the electric spark-generating circuit, the solenoid being connected in shunt with the spark gap, for instance in the manner illustrated in FIG. 7. Therefore the magnitude of the current is a function of the voltage across the gap between the tool electrode 1 and workpiece 6. When electrical discharges take place across the gap between the tool electrode 1 and the workpiece 6 to effect machining of the latter, the coil windings of the solenoid will be bypassed by the electrode/workpiece junction so that little or no voltage is applied across the coil windings. If, however, the gap between the tool electrode 1 and the workpiece 6 widens, more voltage will exist across the gap and current will flow through the coil windings. The electro-hydraulic valve is biased by off-centering the "spool" so that in the absence of an electric current through the coil windings, the fluid enters the lower chamber causing the electrode 1 to rise away from the workpiece 6 and on the other hand when the gap widens sufficiently so that more current flows through the coil windings, the spool is biased in the opposite direction so that fluid enters the upper chamber causing tool electrode 1 to approach the workpiece.

An improvement on the arrangement of FIGURE 1 has been made as shown in FIGURE 2 in which piston 7 is stationary and cylinder 9 is free to move between bearing surfaces 8. This arrangement provides a greater distance between bearing surfaces thus ensuring greater rigidity and stability. A further improvement lies in the provision of connections between electro-hydraulic valve 10 and the chambers in the cylinder 9 at each side of the piston 7 by means of co-axial tubes through piston rod 11. This arrangement provides the shortest possible length of piping between the electro-hydraulic valve and the cylinder chambers thus minimising "back-lash" in the operation of the system which can arise from the compressibility of the hydraulic fluid.

It is occasionally necessary to introduce a small vertical oscillatory movement to the electrode of approximately 0.001" to 0.005" amplitude to assist dispersal of swarf and carbon during the spark-machining operation. A method of achieving this oscillatory movement is illustrated by FIGURE 3. The control current from the spark-generating circuit to the electro-hydraulic valve is routed via a modulator 16 or gating circuit.

Figure 5:
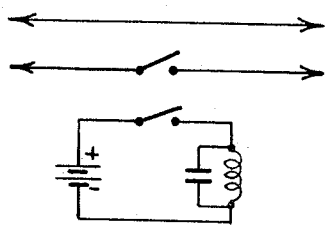
Figure 6:
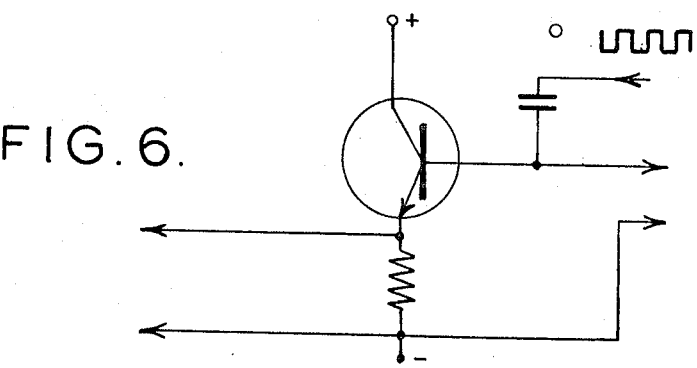

Examples of such a circuit are given in FIGURES 4 to 6. The modulator can be either mechanical, electro-mechanical or electric in form, the latter employing either electron valves or transistors.

In all cases the function of the modulator is to remove or reduce the control current for short periods, at regular intervals, so that the mechanical bias of the electro-hydraulic valve causes the electrode to rise away from the workpiece. Reestablishment of the current then causes the electrode to return to its correct working position.

A disadvantage of a hydraulically-actuated electrode system is connected with the setting-up of the electrode in relation to the workpiece prior to the commencement of the spark-machining operation. It is necessary to align the electrode accurately with the workpiece and this operation is most conveniently carried out when the electrode and workpiece are in close juxtaposition. At this stage the electro spark-generating circuit is not in operation and, therefore, it is necessary to bring the electrode into close relation with the workpiece by non-automatic operation of the hydraulic system. This non-automatic operation can lead to accidental contact between electrode and workpiece. The very high forces generated by the hydraulic fluid can result in distortion of the mechanical system.

Figure 7:
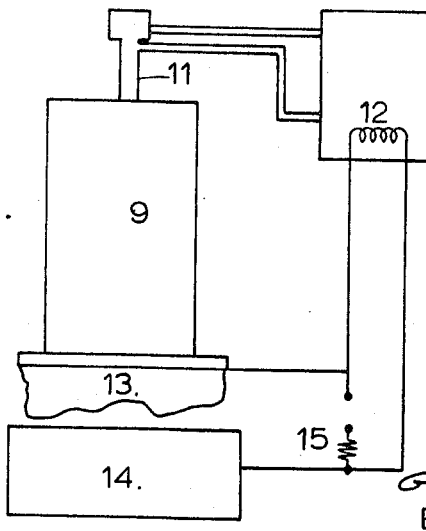
FIGURE 7 is a diagrammatic representation of still a further arrangement.

A method to overcome this problem is outlined in FIGURE 7, where a low voltage V is applied to coils 12 of the electro-hydraulic valve, via an impedance 15, in the sense causing the electrode 1 to lower towards the workpiece 6. When electrical contact occurs between 1 and 6 the current through coils 12 is by-passed by the electrode/workpiece 13, 14 junction and the mechanical bias of the "spool" in the electro-hydraulic valve causes the electrode to rise. The current again flows through coils 12 causing the electrode to lower once more. Thus a trembler action is produced, with the electrode "bouncing" on the workpiece with an amplitude of say, .001". Voltage V is sufficiently low to prevent sparking between the electrode and workpiece. No large mechanical forces are developed between electrode and workpiece and alignment can be carried out without fear of damage to the mechanical system. A further advantage of this arrangement lies in the ability to align a new electrode in a partially eroded cavity in the workpiece. When the electrode and workpiece are moved relative to one another correct alignment can be assumed when the electrode has entered to a maximum depth in the workpiece impression.

Figure 8:
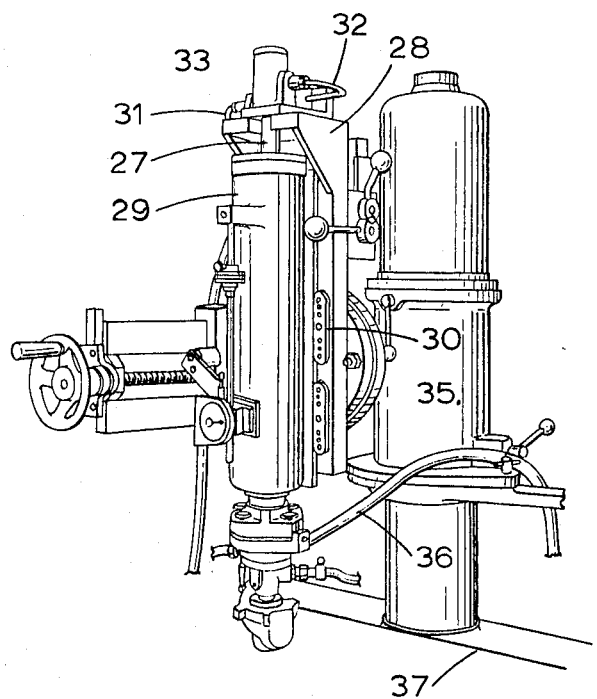
FIGURE 8 is a perspective view of a hydraulic head assembly for an electro-erosion machine.

Referring lastly to FIGURE 8, a piston rod 27 is rigidly mounted on a machine head 28 and vertically movable cylinder 29 slides in recirculating ball bearings 30 carried by the machine head. 31 and 32 are pipelines conveying hydraulic fluid to a header 33 at the top of the piston rod 27 which has coaxial conduits as in FIGURES 2, 3 and 7.

35 is the electro-hydraulic valve casing and 36 the pipeline supplying bathing fluid to the electrode from the bath 37.

I claim:
1. Electro-erosion apparatus including a hydraulically actuated opposed-electrode spacing control system having a rigidly mounted piston disposed opposite one electrode, and a movable cylinder carrying the other electrode and surrounding said piston and being slidably guided thereupon and the outer periphery of the cylinder being slidably guided by external stationary bearing surfaces insuring rigidity and lateral stability of the cylinder during its sliding movement.

2. Electro-erosion apparatus including a hydraulically actuated opposed-electrode spacing control system having a rigidly mounted piston disposed opposite one electrode, and a movable cylinder carrying the other electrode and surrounding said piston and being slidably guided thereupon and the outer periphery of the cylinder being slidably guided by external stationary bearing surfaces insuring rigidity and lateral stability of the cylinder during its sliding movement, said piston having a piston rod extending through the top of the cylinder and housing conduit means for hydraulic fluid.

3. Electro-erosion apparatus including a hydraulically actuated opposed-electrode spacing control system having a rigidly mounted piston disposed opposite one electrode, and a movable cylinder carrying the other electrode and surrounding said piston and being slidably guided thereupon, an electro-hydraulic valve operative in response to a control current to control the electrode spacing, and said control current being routed via a modulator means operative to cyclically modulate the control current to impart to the cylinder oscillatory vertical movements of low amplitude.

4. Electro-erosion apparatus including a hydraulically actuated opposed-electrode spacing control system having a rigidly mounted piston disposed opposite one electrode, and a movable cylinder carrying the other electrode and surrounding said piston and being slidably guided thereupon, an electro-hydraulic valve for controlling the flow of fluid to the control system and means controlling the flow of current to the valve for adjusting the electrode spacing in relation to the workpiece when setting up the apparatus before the spark generating circuit is in operation, comprising means for supplying a low voltage current across the electrodes and to the electro-hydraulic valve, said voltage being adequate to cause the valve to bring the electrode into precise contact with the workpiece, but being insufficient to cause substantial workpiece erosion.

References Cited
UNITED STATES PATENTS

| | | | |
|---|---|---|---|
| 2,989,616 | 6/1961 | Mironoff | 219—69 |
| 3,128,364 | 4/1964 | Wanttaja et al. | 219—69 |
| 3,134,011 | 5/1964 | De Brujn | 219—69 |

RICHARD M. WOOD, *Primary Examiner.*

R. F. STAUBLY, *Assistant Examiner.*